Feb. 19, 1957 T. L. DIMOND 2,782,259
CALLING SUBSCRIBER IDENTIFIER USING TRANSISTOR OSCILLATOR IN SUBSETS
Filed Dec. 23, 1953
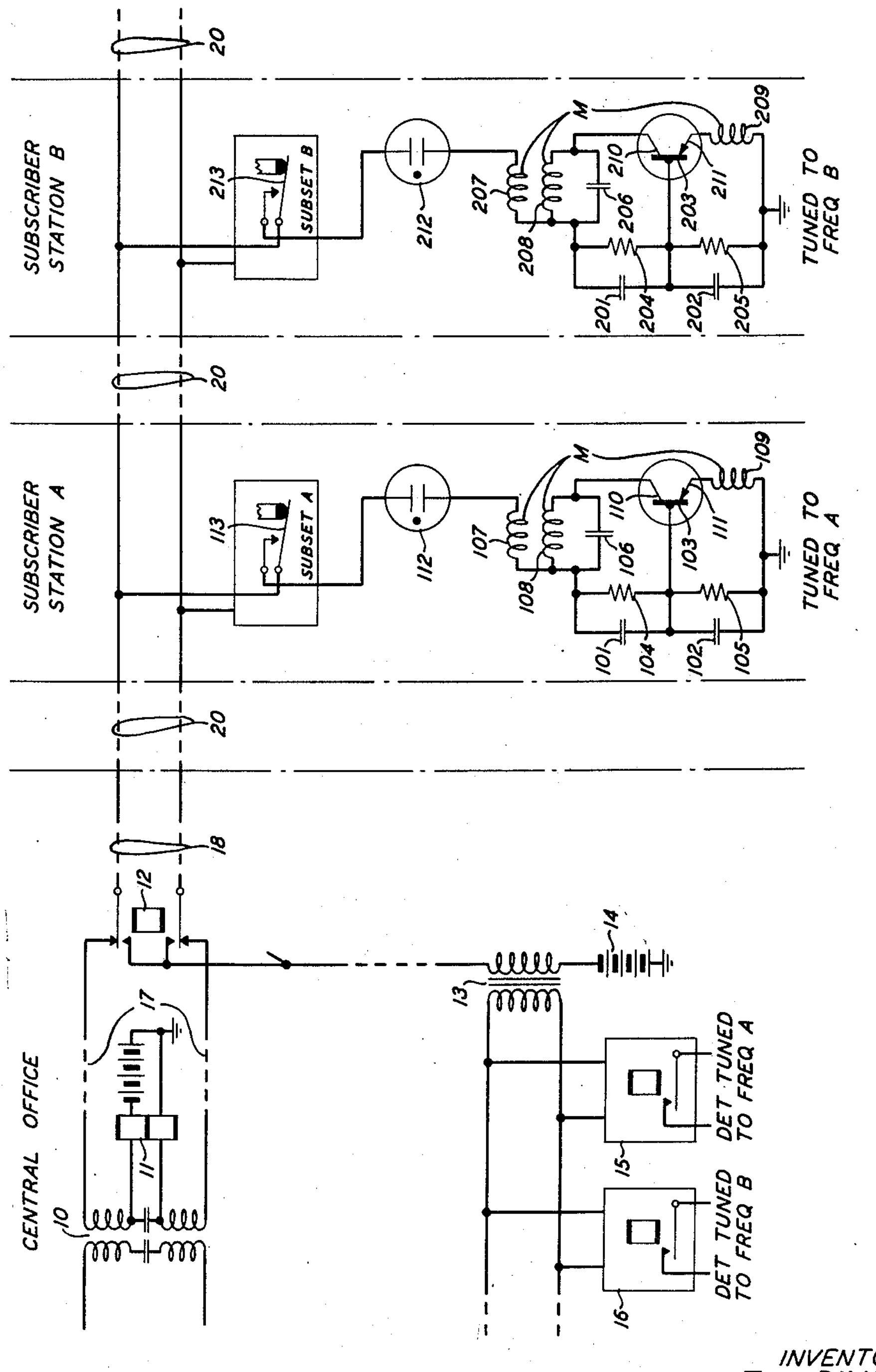
INVENTOR
T. L. DIMOND
BY William F. Simpson
ATTORNEY

United States Patent Office 2,782,259

Patented Feb. 19, 1957

2,782,259

CALLING SUBSCRIBER IDENTIFIER USING TRANSISTOR OSCILLATOR IN SUBSETS

Thomas L. Dimond, Rutherford, N. J., assignor to Bell Telephone Laboratories, Incorporated, New York, N. Y., a corporation of New York Application December 23, 1953, Serial No. 400,039

4 Claims. (Cl. 179—17)

This invention relates to automatic telephone switching circuits and more particularly to circuits, methods and apparatus for identifying calling subscribers on a party line.

Numerous attempts have been made and numerous arrangements proposed for identifying the individual parties on a party line for charging or other purposes. In such arrangements, it is desirable to supply all of the power or energy over the subscriber's line and in addition it is desirable that the equipment provided at the subscriber's station be simple and reliable and require substantially no maintenance and thus have no moving parts. Furthermore, it is desirable that the equipment at the subscriber's station for identifying the individual parties on the party line give a positive identification which is unaffected by changes in a supply voltage or power delivered over the subscriber's line and also be substantially independent of the line conditions, that is, the length of line between the subscriber's station set and the central office, as well as other line conditions and characteristics. Furthermore, it is desirable that the equipment provided for identifying the subscriber's station be employed in such a manner that it does not materially interfere with signaling, supervision, or communication over the subscriber's line and at the same time be readily available any time it is desired to make an identification of the particular party employing the party line.

An arrangement is disclosed in Patent 1,864,524, granted to Bragg June 28, 1932, for identifying calling stations on a party line which arrangement employs a cold cathode gaseous discharge oscillator located at the subscriber's stations. The oscillators are turned to different frequencies at the different stations of a party line and the frequency applied by such oscillators to the line determined at the central office. The frequency generated by such oscillators are affected by the central office battery voltage applied to the line which causes them to operate and in addition the frequency generated by such oscillators is also affected by the length of line and other line characteristics. In other words, the frequency of oscillation of such oscillators varies with the applied voltage, the length of line, the resistance of the line, the capacity of the line and other factors. Consequently, such an arrangement is unsuitable for widespread use in telephone systems.

It is an object of the present invention to provide an improved subscriber's identifying arrangement which is simple and requires a minimum of moving parts at the subset, is reliable in operation and substantially unaffected by normal variations of line voltage and line circuit conditions.

Briefly, a transistor oscillator is located at the subscriber's station. The transistor oscillator requires only a very small amount of power so that this power may be readily supplied over the subscriber's line. Furthermore, the transistor oscillator is arranged so that the constants of the inductance and capacity associated therewith accurately determine the oscillating frequency. Consequently, such frequency is substantially independent of the supply voltage and also the line characteristics extending between the party line's station set and the central office.

Another feature of this invention relates to circuits, methods and apparatus for operatively interconnecting the oscillator with the subcriber's line only when it is desired to identify the calling party of the subscriber's line.

In accordance with the above feature of this invention a cold cathode gas discharge tube is connected between the transistor oscillator and at least one line conductor extending to the central office. The gas discharge tube is normally non-conducting so that the transistor oscillator circuit is normally effectively disconnected from the subscriber's line. Thus the transistor oscillator does not normally in any way interfere with signaling, supervsion or communication over the subscriber's line.

However, when it is desired to identify the calling station the sufficiently high voltage is applied to the subscriber's line to initiate a discharge through the cold cathode gas discharge tube which will thereupon break down and pass sufficient current to energize the transistor oscillator. Likewise, the gas discharge tube when conducting, provides a sufficiently low impedance path between the transistor oscillator and the subscriber's line so that oscillations from the oscillator are conveyed to the subscriber's line and then to the central office where suitable equipment is provided for determining the frequency of oscillation and thus determining the identity of the calling subscriber.

The foregoing objects and features of this invention as well as other objects and features thereof will be more readily understood from the following description and claims when read with reference to the attached drawing which shows in outline form the equipment provided at the central switching station and also the equipment at two subscriber's stations connected to a party line.

While the drawing shows only two subscriber's stations connected to a single party line, as indicated in the figure, this line may extend to many other stations and the individual stations to which the line extends and may readily be identified in the same manner as the two stations actually shown in the drawing.

A subscriber's line 20 is shown in the drawing extending from a central office to a subscriber's station A and a subscriber's station B. The subscriber's station A and the subscriber's station B while usually located near one another are not usually located at the same place and may be located a considerable distance apart; they also may be located at the same place. Likewise, the central office is frequently located a considerable distance from either or both of the subscriber's stations A or B but either or both stations A or B or both A and B may be located at the central switching station. Any additional subscriber's stations connected to party line 20 which are not shown in the drawing may be similarly located. Each of the subscriber's stations is provided with an additional contact on the switchhook or cradle mechanism which contact is represented by contact 113 at subscriber station A and contact 213 at subscriber station B. When the substation apparatus is normal or at rest and not employed in making or receiving calls the contacts 113 and 213 are open. However, when a call is initiated at station A, contacts 113 are closed when the subscriber picks up the receiver or handset. Closure of these contacts connects the upper electrode of the gas discharge tube 112 to one of the line conductors, such as the upper line conductor at line 20. Normally, however, the signaling and communication voltages applied to the line conductors at the central office from the signaling circuits or from the supervisory relay 11 are insufficient to initiate a discharge through tube 112. Consequently, substantially no current flows through this tube with the result that the transistor oscillator connected to the lower electrode of this tube is operatively disconnected from the subscriber's line 20.

When it is desired to identify the calling subscriber the central office equipment functions to cause relay 12 to be operated in a suitable manner under control of the switching and identifying equipment at the central station which equipment operates in a well known and well understood manner. The operation of relay 12 applies a high voltage battery 14 through transformer 13 to one or more line conductors of line 20. This voltage is sufficiently high when applied through the actuated contacts 113 to the upper electrode of tube 112 to initiate the flow of current through tube 112 to ground.

The current flowing from source 14 through tube 112 flows through the output winding 107 and then through resistors 104 and 105 to ground. The voltage produced across these resistances is maintained relatively constant by the respective condensers 101 and 102 which are sufficiently large to prevent appreciable alternating-current voltage to be developed across the corresponding resistors 104 and 105. The voltage drops across the resistors 104 and 105 and across the corresponding condensers 101 and 102 are sufficient to energize a transistor or semiconductor oscillator having a base element 103 and emitter element 111 and a collector element 110. This transistor is connected in an oscillating circuit comprising coils 107, 108 and 109 which coils form a transformer and have mutual coupling or inductance between them. The condenser 106 determines the frequency of oscillation and is adjusted to identify station A. Similar equipment is located at station B but here the corresponding condenser 206, together with the windings of the inductance elements 207, 208 and 209 are adjusted so the oscillator will oscillate at a different frequency which different frequency identifies the station B.

The output from the oscillator is coupled through winding 107 and through the gas discharge 112 of the operated contacts 113 to the subscriber's line. The oscillations from the oscillator are thus transmitted to the transformer 13 at the central switching station and from transformer 13 to the tuned detectors 15, 16, etc. The tuned detector 15 is tuned to respond to the frequency A of the oscillator at the subscriber's station A. Tuned detector 16 is tuned to respond to the frequency B generated by the oscillator at the subscriber's station B. When other subscriber's stations are connected to the party line having oscillators which oscillate at other frequencies, additional tuned detectors, one tuned to each of the various possible frequencies, are provided at the central office for responding to the respective frequencies. The response of the tuned detectors is then employed in the usual manner in the particular switching system to control the charging and other functions in the usual manner. Exemplary suitable frequency determining arrangements are shown and described in United States Patent 1,864,524, granted to Bragg June 28, 1932, and in United States Patent 2,320,081, granted to Holden May 25, 1943, and United States Patent 2,370,403 granted to Hecht February 27, 1945.

After the calling station has been identified relay 12 will be released and the high voltage source 14 disconnected from the subscriber's line whereupon the discharge current flowing through tube 112 will be interrupted with the result that the impedance of this tube will become very high and effectively disconnect the oscillator employing the transistor or other semi-conductor device so that it will stop oscillating and not interfere in any way with the other signaling, supervision, or communication currents transmitted over the party line.

Thereafter, the signaling, supervisory, and communication currents will pass between the subscriber's station set and the central switching equipment through the repeat coil at the central office in the usual manner.

It is to be understood that the above-described arrangements are illustrative of the application of the principles of this invention. Numerous other arrangements and modifications may be devised by those skilled in the art without departing from the spirit and scope of the invention.

What is claimed is:

1. In a telephone system a party line, a plurality of subscriber's stations connected to said party line, a transistor oscillator tuned to a different frequency at each of said stations connected to said line, means including manually operable contact means and gas discharge tube means for individually interconnecting each of said oscillators and said subscriber's line and means for energizing an interconnected oscillator over said line and connections between said interconnected oscillator and said gas tube means and said line for applying the output of said interconnected oscillator through said gas tube means to said line.

2. In a telephone system a party line, a plurality of subscriber's stations connected to said party line, an oscillator circuit including a semiconductor material at each of said subscriber's stations, frequency determining means included in each of said oscillator circuits for determining a different frequency of said oscillator at each of said stations, said frequency determining means being substantially independent of the voltage applied to said oscillator and independent of the constants of said line, manually operable switch individual to each of said oscillators tor and independent of the constants of said line, a manutive ones of said oscillators, a cold cathode gas discharge tube connected in said circuit between said line and said oscillator, and means for energizing said gas tube over said line to complete an electrical transmission path from said oscillator to said line.

3. In a telephone system a party line, a plurality of subscriber's stations connected to said party line, a transistor oscillator individual to each of said subscriber's stations, frequency determining means included in each of said oscillator circuits operating substantially independently of the voltage applied to said oscillator and independent of the constants of said line, a series circuit at each of said subscriber's stations extending from said line, said series circuit including a manually operable switching device, said oscillator circuit and a cold cathode gas discharge device, and means for initiating a discharge through one of said gas discharge device to supply power to said oscillator and to provide an electrical transmission circuit between said line and said oscillator.

4. In a telephone system a party line, a plurality of subscriber's stations connected to said party line, a central switching station connected to said party line, a transistor oscillator tuned to a different frequency at each of said subscriber's stations connected to said line, means including a manually operable switch and a gas discharge tube at each of said subscriber's stations for interconnecting the oscillator at the respective subscriber's stations and said subscriber's line, means for energizing any interconnected gas tube and oscillator over said line, connections for applying the output of said interconnected oscillator through said gas tube to said line, and frequency determining means at said central station for determining the frequency applied to said line at said subscriber's station.

References Cited in the file of this patent

UNITED STATES PATENTS 2,143,563 Levy et al. ............ Jan. 10, 1939